Oct. 14, 1952  H. J. VAN DOORNE  2,613,754
MOTOR VEHICLE ENGINE MOUNTING
Filed May 24, 1948  6 Sheets-Sheet 1

INVENTOR
HUBERTUS JOSEPHUS VAN DOORNE
BY
ATTORNEY

Oct. 14, 1952 — H. J. VAN DOORNE — 2,613,754
MOTOR VEHICLE ENGINE MOUNTING
Filed May 24, 1948 — 6 Sheets-Sheet 2

INVENTOR
HUBERTUS JOSEPHUS VAN DOORNE
BY Hugh A. Kirk
ATTORNEY

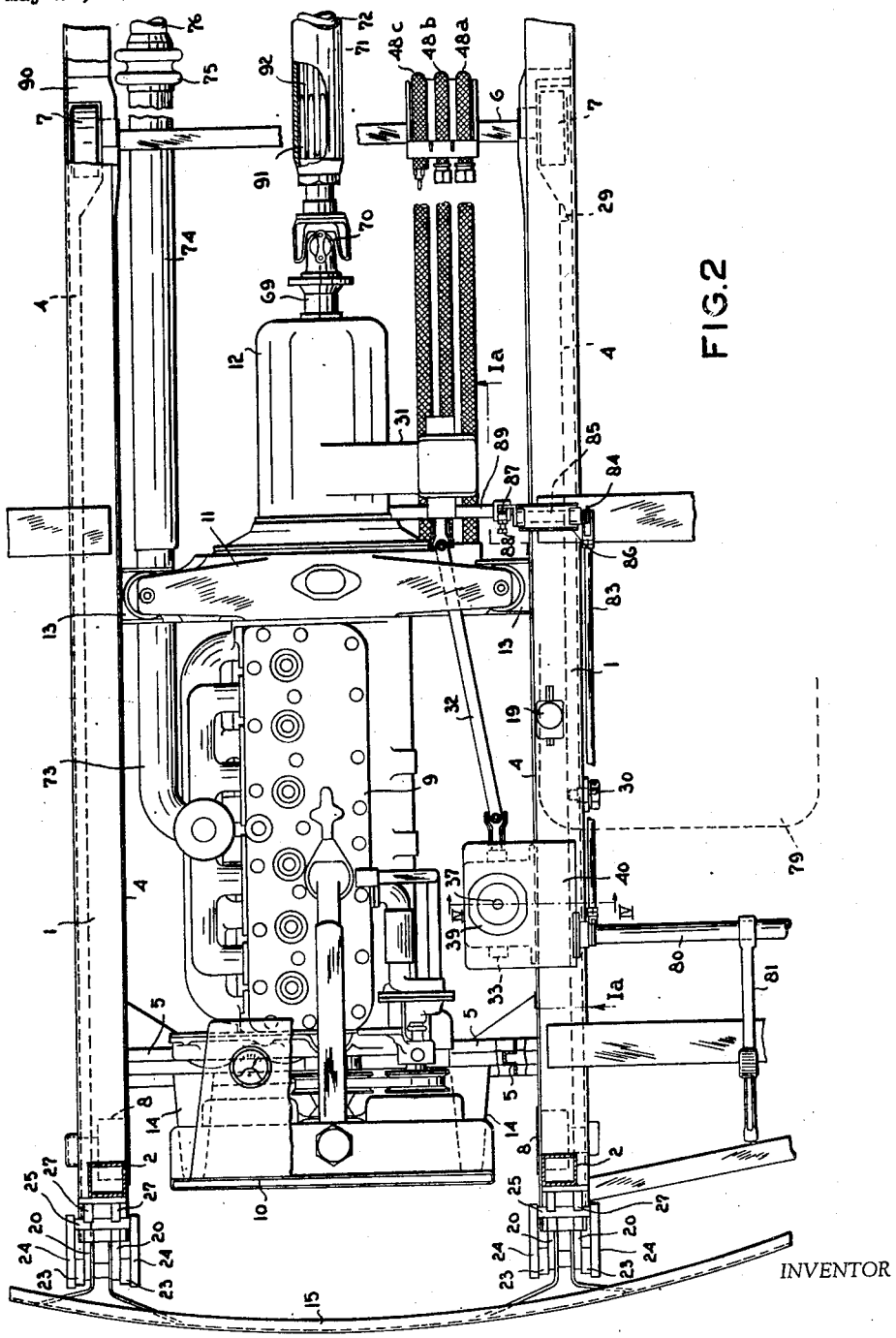

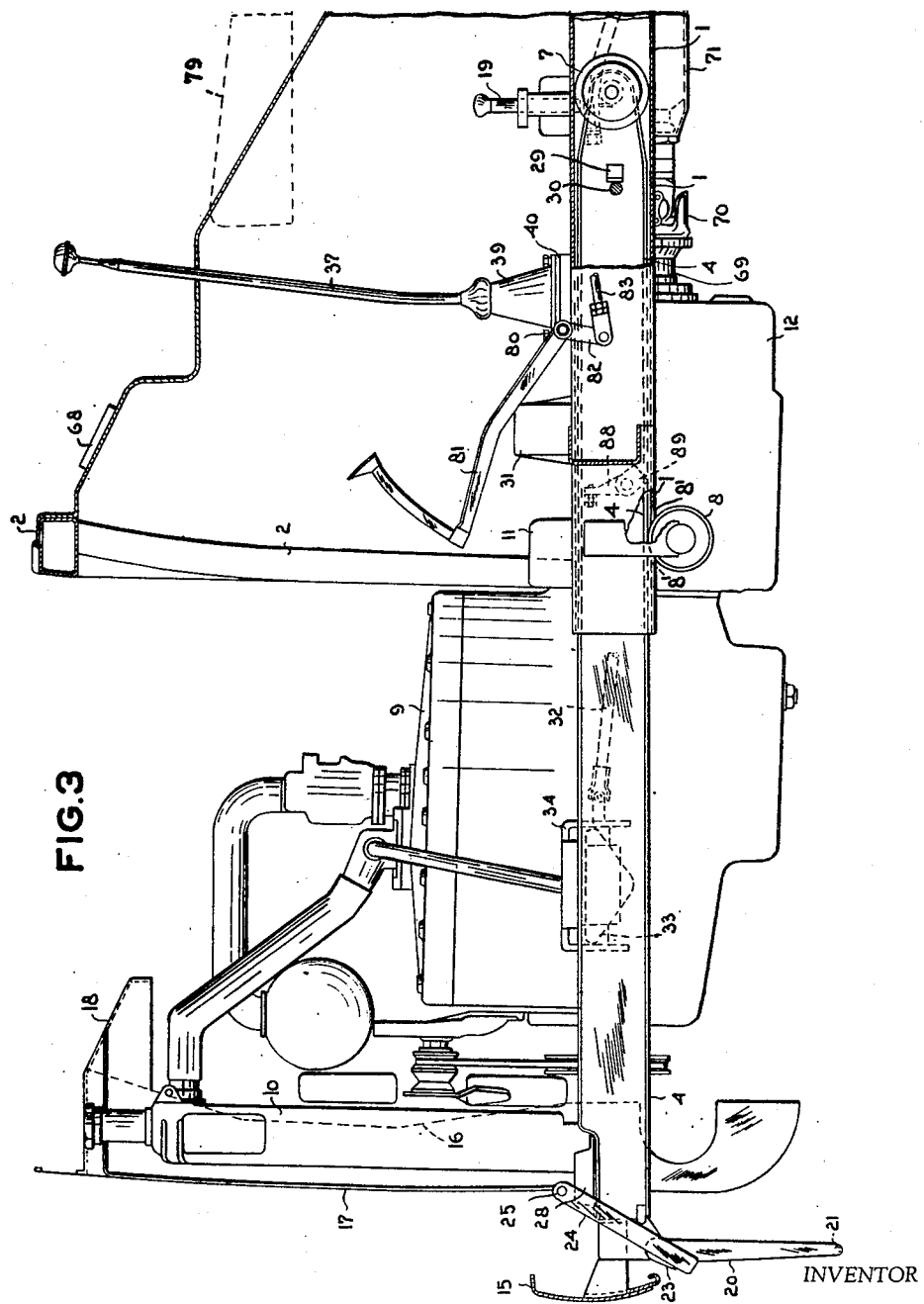

Oct. 14, 1952     H. J. VAN DOORNE     2,613,754
MOTOR VEHICLE ENGINE MOUNTING

Filed May 24, 1948     6 Sheets-Sheet 6

INVENTOR
HUBERTUS JOSEPHUS VAN DOORNE

BY

ATTORNEY

Patented Oct. 14, 1952

2,613,754

UNITED STATES PATENT OFFICE 2,613,754

MOTOR VEHICLE ENGINE MOUNTING

Hubertus Josephus van Doorne, Deurne, Netherlands

Application May 24, 1948, Serial No. 28,949
In the Netherlands May 29, 1947

11 Claims. (Cl. 180—64)

This invention relates to motor vehicles. More particularly it deals with a removable engine in a vehicle, such as for example, in a truck or autobus wherein the engine is under the body of the vehicle and is very difficult to reach for repairs, maintenance and testing.

Previously, removable engines required the disconnection of the fuel line, electric wires to the ignition, starter motor, and battery, the speedometer cable, thermometer tube, tube to the oil pressure gauge, the exhaust pipe, the drive shaft, the accelerator connections, etc. which took considerable time as well as completely isolated and operatively disconnected the engine so that it could not be tested or run when removed from its position in the vehicle without again making several of these connections. Also the engine in many such vehicles is covered by a detachable hood or plates which soon loosen and produce rattles and permit dust, dirt and fumes from the engine to enter the driver's or passenger carrying compartment.

It is an object to this invention to produce a new, simple, efficient, and effective engine mounting for motor vehicles whereby the engine may be moved to an easily accessible position for testing, repairs and maintenance without specifically disconnecting any of its control or driving connections with the vehicle.

Another object is to provide a vehicle in which no fumes or dirt from the engine can enter the passenger carrying compartment of the vehicles thereby reducing the fire hazard from fumes inside the vehicle.

In accordance with this invention, the improved motor vehicle comprises a separate support or auxiliary frame for the engine and, if desired, also for its radiator, clutch, and/or transmission or gear box, which separate support may be moved relative to the main frame of the vehicle into a position, preferably outside the normal boundaries of the main frame, so that the engine may be readily accessible. Flexible, extensible, clutch and/or abutting type couplings for the control and driving connections between engine support and the vehicle frame are provided which permit the engine to be operated in any position of its separate support for testing purposes.

The separate support for the engine may be slidably mounted on the frame of the vehicle and may also include means for aiding the movement of this support, so it may be moved by one man at any time, even for maintenance of the engine such as the addition of oil or water. A positive locking means is preferably provided for maintaining the support with the engine in its normal vehicle driving position on the frame.

The flexible connections for electricity, fuel, and the fluid control system, such as for the brakes, may be connected to the engine and its support from the main body of the vehicle by flexible hoses and cables mounted so that slack in these connections, particularly when the engine and its support are in the normal driving position, are taken up so as not to produce a hazard. The exhaust pipe, driving shaft, gear shift lever, clutch lever and accelerator may be provided with telescopic extension and/or dog-type clutches which are operatively engaged when the engine and its support are in their vehicle driving position.

By providing an easily extractable or removable engine, the engine when in its driving position, may be placed in a compartment in the vehicle which is sealed from the driver's and/or passenger or article carrying compartment so that no dust, dirt or fumes from the engine can get inside the vehicle. This may be accomplished in the case of an autobus or truck by placing a unitary hood over the engine which is tightly fixed to the body around its edges. One or more windows may be provided in this hood, however, so that the driver may see the dials of instruments mounted on the engine.

The above mentioned and other features and objects of this invention and the manner of attaining them will become more apparent and the invention itself will be best understood by reference to the following description of an embodiment of the invention taken in conjunction with the accompanying drawings, wherein:

Figs. 1 and 1b taken together comprise two complementary portions of a side elevation of the front end of a motor vehicle partly in section and with parts broken away, showing a slidable support for the engine and transmission of a said vehicle mounted in its driving position.

Fig. 2 is a top plan view of the structure shown in Figs. 1 and 1b without the hood.

Figure 1:
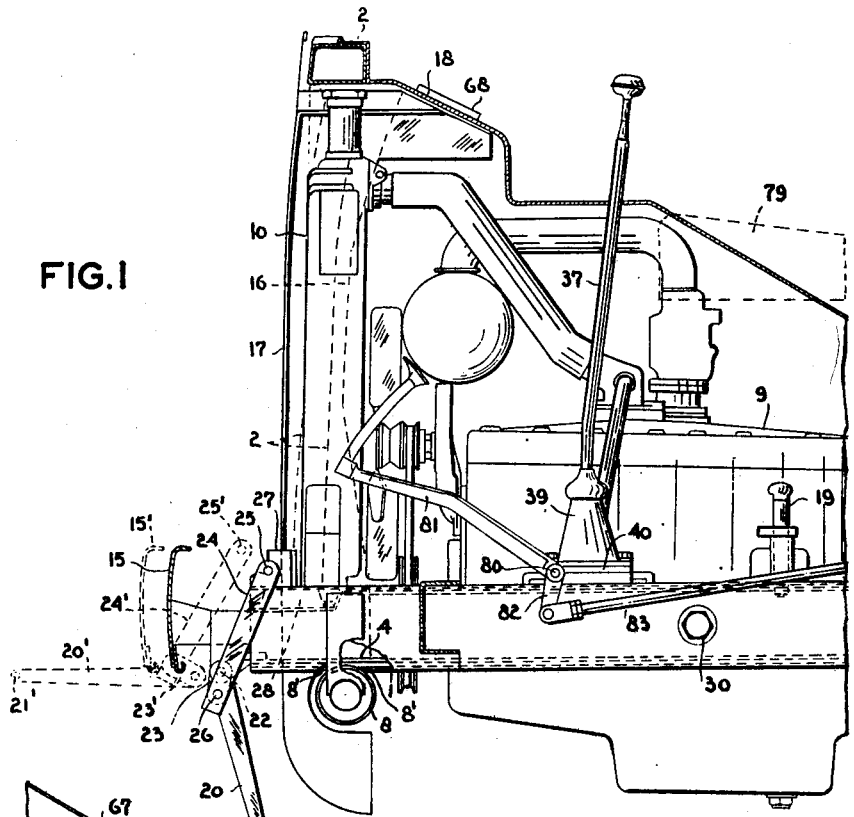
Fig. 1a is a side elevation similar to Figs. 1 and 1b, with more parts broken away, taken along line Ia—Ia in Fig. 2.
Figure 1B:
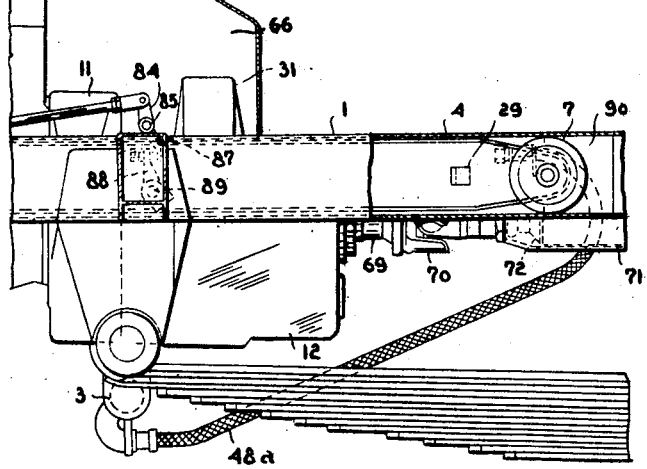
Figure 3A:
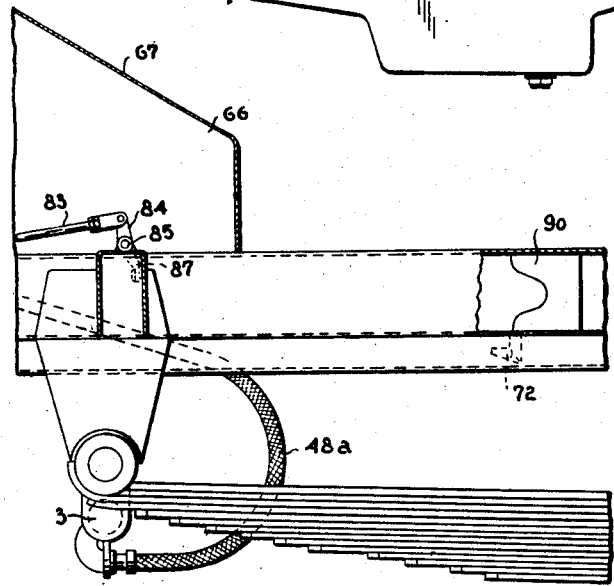

Figs. 3 and 3a taken together comprise two complementary portions of a side elevation corresponding with Figs. 1 and 1b but with the support for the engine in its extended position.

Figure 4:
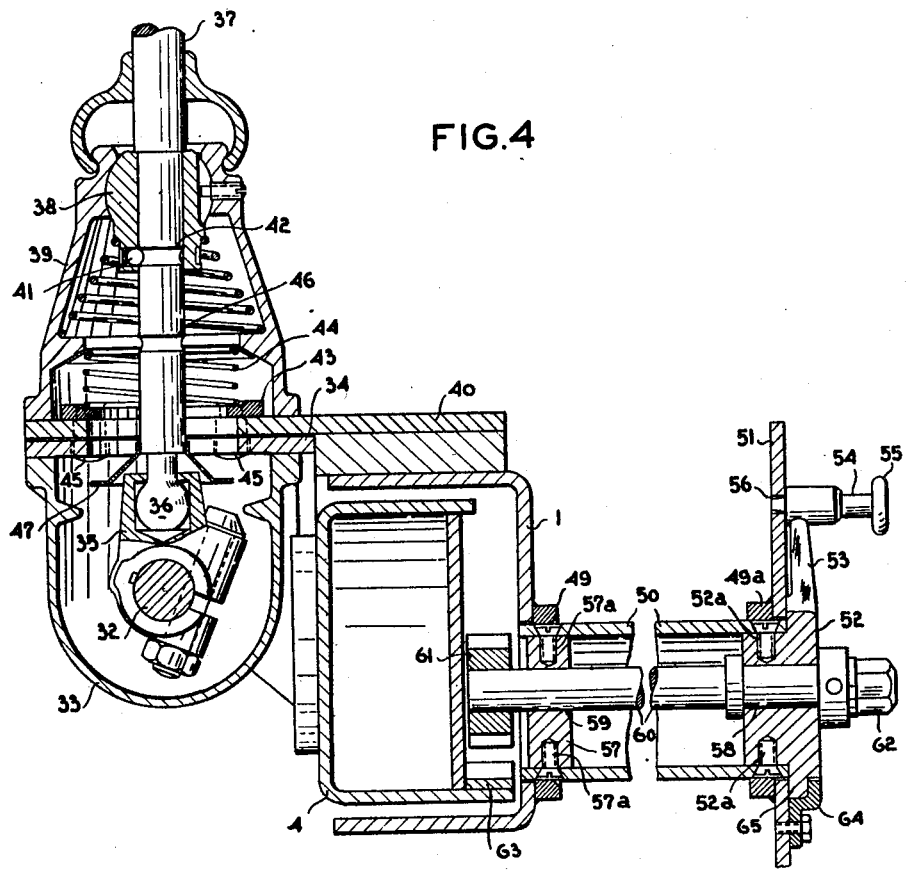

Fig. 4 is a vertical section of one embodiment of a gear shift lever connection in operative position taken along line IV—IV in Fig. 2 together with a modification of a unit for moving the engine support relative to the vehicle main frame, shown in inoperative position.

Figure 5:
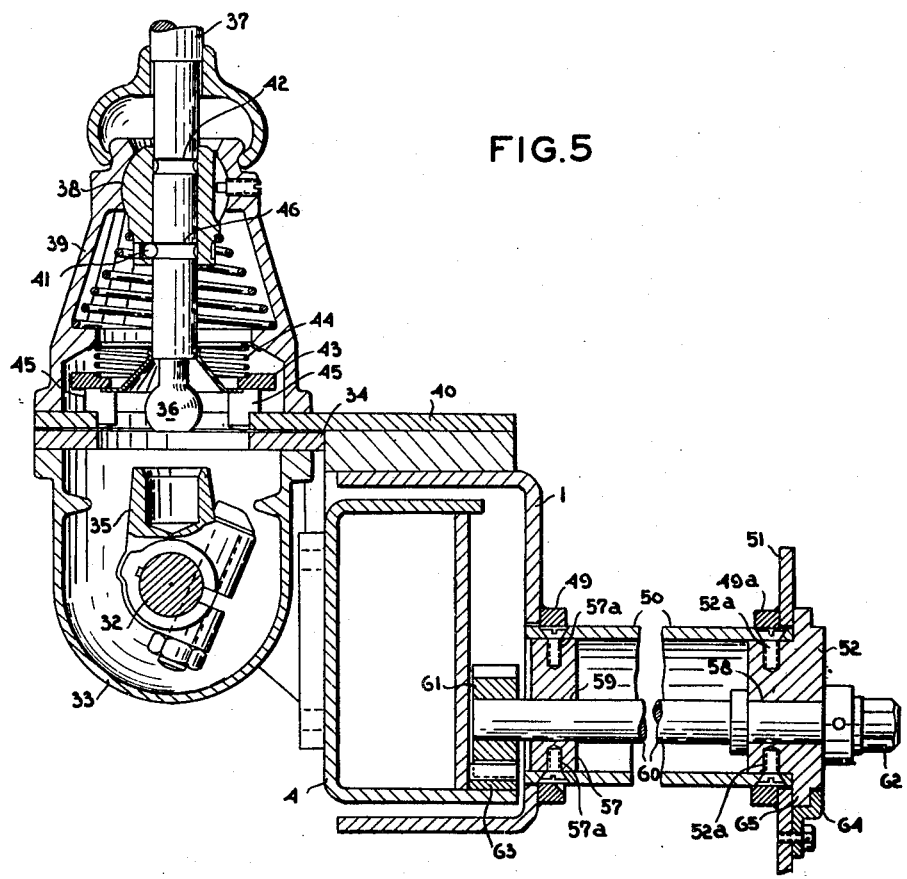

Fig. 5 is a vertical section similar to Fig. 4 showing the gear shift lever in inoperative position and the unit for moving the engine support relative to the vehicle main frame, in operative position.

Figure 6:
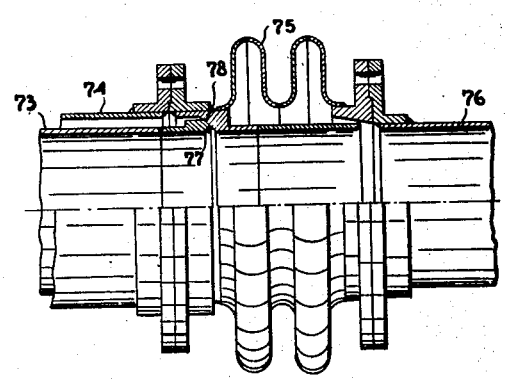

Fig. 6 is a partial sectional view of the exhaust pipe connection shown in Fig. 2.

Referring specifically to Figs. 1, 1b and Fig. 2, there is shown one embodiment in the present invention applied to the engine, radiator, and transmission of an autobus or truck, which has the engine mounted inside the front of the body portion of the vehicle. In these figures, the body portion is not shown and all but the front central portion of the main frame has been broken away so as more clearly to show the invention. The front part of the main frame comprises two parallel U-shaped channels 1 rigidly spaced by an inverted U-shaped bridge 2 over the top of the radiator 10 and a suspended cross-beam 3 below the transmission 12, adjacent which there is shown connected one of the vehicle leaf springs in Figs. 1b and 3a.

The support for the engine 9, its radiator 10, clutch 11, and transmission 12, comprises a pair of parallel beams 4 which slide in the U-shaped channels of the beams 1 of the main frame, and are spaced at the front end by the channeled beam 5 (see Fig. 2) and at the rear end by the tubular beam 6 which may also comprise an axis for the rollers 7 which roll along the flanges of the beams 1 to reduce the friction of sliding the support out of the front end of the main frame of the vehicle. There is provided fixed to the beams 1 at their lower front edge, rollers 8 to support the other end of the slidable engine supporting frame, which rollers 8 contact the lower flanges of the beams 4. The lower flange of the beams 1 in the region of rollers 8 is broken away at 8' so that the front end of the supporting frame rests on these rollers 8 when it is being moved into and out at its projected or extended position (see Fig. 3).

The front end of the engine 9 with the radiator 10 are supported by the cross-beam 5 carrying brackets 14, and the rear end of the engine including the clutch 11, is supported on each side by the brackets 13 extending toward each other from the beams 4.

The front bumper 15 of the vehicle, which is generally mounted on the main frame of the vehicle, may be secured to the front end of the beams 4 together with frame 16 (see Fig. 3) surrounding the radiator and supporting the front radiator grille 17. The vertical frame 16 may be provided with a rearwardly sloping upper face 18 upon which the instruments, such as the speedometer, ammeter, thermometer, oil pressure gauge, and the like, may be mounted, in that this portion of the frame rests close to and in front of the driver of the vehicle when in its driving position as seen in Fig. 1. Since these instruments are attached to the engine and moved therewith on the slidable support for the engine there is no need to provide flexible or extensible connections between them and the engine.

In the driving position the engine and its support may be locked in the position shown in Fig. 1 and 1b by an easily accessible bolt 19, which may be located adjacent the driver's position in the vehicle and may be pulled up by him when the engine and its support are to be removed for maintenance or other purposes. Additional bolts, such as 19, may be provided, if desired, along the same or the other side of the frame.

In order to allow the engine to be removed from its locked driving position and to be extended out in front of the vehicle into the position shown in Fig. 3, a toggle lever system is arranged at the front ends of each of the engine supporting beams 4. Each of said toggle lever systems consists of a double lever 20 connected by a cross bar serving as a handle 21. The double levers 20 are pivoted at 22 to the front ends of their corresponding slidable beams 4, and are connected to form rigid units with short lever arms 23 which thus follow the pivotal movement of the levers 20. These arms 23 are pivotally connected at 26 to yokes consisting of double links 24 and notch engaging cross bars 25 at their free outer ends.

When the auxiliary engine supporting frame 4 is in its vehicle driving position, the cross bars 25 engage notches of hook-shaped members 27 mounted on the front end of each main frame beam 1; and rubber blocks 28, secured to the upper faces of the engine supporting beams 4, are urged against the lower faces of the upper flanges of the main frame beams 1. In this position the front ends of the engine supporting beams 4 are lifted from the rollers 8 (see Fig. 1). In this same position, the rounded rear ends of the beams 4 are urged into U-shaped recesses in rubber blocks 90, shown in Figs. 1b, 2 and 3a. These blocks 90 are fastened between opposite flanges of the U-shaped main frame beams 1. In this way the engine supporting frame is resiliently locked and prevented from rattling.

When it is desired to remove the engine from its driving position and extend it out in front of the vehicle into the position shown in Fig. 3, the levers 20 at both sides of the vehicle are pulled by handles 21 in the forward direction, so that said levers are swung clockwise about their pivots 22. When doing so, the pivots 26 pass to and through a dead center position on the line connecting pivots 22 and 25, during which movement the rubber blocks 28 are compressed slightly more. When continuing the movement passed said dead center position towards the position indicated by the dotted line 20' in Fig. 1, the auxiliary frame is lowered until it rests on the rollers 8, and the rubber blocks 28 are no longer compressed or even contacted with the frame beams 1. Also after the dead center position is passed, the links 24 with their bars 25 push against the top and back of the hooks 27 mounted on the main frame, to loosen said auxiliary frame from its seats in blocks 90, and to overcome any resistance between the clamping parts and connections between said auxiliary frame and said main frame. As the links 24 are swung further about the cross bars 25 as pivots, and during the latter part of the movement of the levers 20 toward the position 20' shown in Fig. 1, the auxiliary frame is pushed out of the main frame until the front bumper 15 has reached the position indicated by the dotted line 15'. The cross bars 25 may now be released from the hooks 27 and the auxiliary frame is free to be pulled further out of the main frame, while riding on the rollers 7 and 8.

Similarly, when the engine and its support are to be replaced from the position shown in Fig.

3 to that shown in full lines in Fig. 1, the engine is pushed towards the vehicle until it is in the dotted line position 15' shown in Fig. 1 where the cross bars 25 may be moved again into the hooks 27. If now the lever 20 is pushed downwardly in a counter-clockwise direction, the auxiliary frame 4 is drawn into its place by the links 24, and upon passing the dead center position mentioned above, the rubber blocks 28 are compressed again, and the engine is locked in its driving position as described above.

The extension of the slidable support may be limited by abutment flanges 29 fixed on one or both sides of the slidable frame which engage the bolt 30 mounted on the beam 1 as shown in Fig. 3 to prevent the slidable support from being completely pulled away from the vehicle and breaking the extensible and flexible control connections thereto. However, when it is necessary to completely remove the engine and its support from the vehicle, such may be easily done by disconnecting the connections 48a, 48b and 48c, and removing the bolt 30 from the side of the frame beam 1. Such would permit complete withdrawal of the engine on its support from the rest of the vehicle and make the replacement of another engine on a similar support easy and rapid.

Figure 1A:
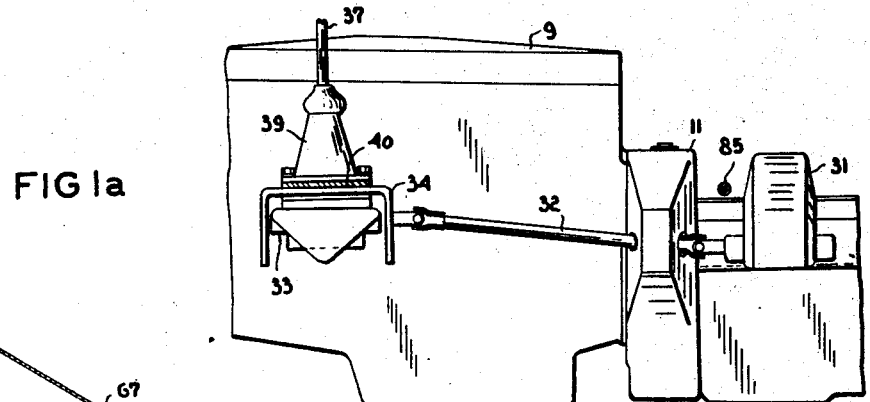

If the transmission is not located on the slidable supporting frame with the engine, the connection between the gear shift lever 37 and the transmission need not be broken or extended. One embodiment of a connection which may be easily engaged and disengaged when the transmission is mounted on the slidable supporting frame for the engine, and the gear shift lever is mounted on the main frame of the body of the vehicle, is shown in detail in Figs. 1a, 4 and 5. Herein a universally jointed rod 32 connects the transmission gear-shifting mechanism in the housing 31 on transmission 12 to housing 33 mounted on an inverted U-shaped bracket 34 mounted on one beam 4 of the slidable engine supporting frame. Inside this housing 33 a socket member 35 is fixed to the shaft 32, into the socket of which the ball-shaped end 36 of the gear shift lever 37 may be releasably engaged. The gear shift lever 37 is pivoted between its ends by a ball joint 38 journaled in housing 39 rigidly fixed to the frame 1 by means of plate 40 covering the top of housing 33 when the engine is in driving position shown in Figs. 1 and 4. The ball joint 38 is provided with a spring pressed ball 41 which may be seated in either groove 42 or 46 along the gear shift lever 37, depending upon whether the ball 36 of the gear shift lever is in engagement with the socket 35 as shown in Fig. 4 or withdrawn therefrom clear of the top of the housing 33 as shown in Fig. 5. This latter position permits the housing 33 to be slid out from under the plate 40 unobstructed by the projecting end of lever 37 and locking pins 45 mounted on plate 43 which plate is raised against the action of spring 44 by the outwardly extending conical flange 47 on lever 37 which engages the bottom of plate 43 to disengage the pins 45 from their cooperating holes in the top of bracket 34. The lever 37 is maintained in the position shown in Fig. 5 against the action of spring 44 by the engagement of ball 41 in the groove 46. The conical shaped flange 47 also serves to center the socket 35 for insertion of the ball 46 when the lever 37 is pushed downwardly from its position shown in Fig. 5 to that shown in Fig. 4. Since the gear shift lever moves the socket 35 both axially and circumferentially of the shaft 32, this engagement and disengagement of the ball 36 to and from socket 35 is preferably accomplished when the gear shift lever is in its neutral position as shown in Fig. 4.

The necessary electrical, fuel, and fluid pressure, vacuum or other control conduits between the engine and the other parts of the vehicle are provided by the flexible connections 48a, 48b, and 48c, one end of each of which is connected to the back end of the slidable frame, and the other end of each of which is connected to the hollow cross beam 3 between the two ends of the slidable support when said support is in its driving position as shown in Fig. 1, so that the cables 48 will remain taut when the vehicle is being driven by the engine. A portion of these cables 48 are broken away in Fig. 2 to more clearly show their ends which are connected to the slidable frame. The other ends of these cables enter the tubular cross-beam 3 for distribution along the frame to the different parts of the vehicle.

In Figs. 4 and 5 there is also shown a modification, not shown in the other views, comprising a special rack and pinion means for moving the slidable support, in case one man cannot pull it from the vehicle by the handles 21, such as for example when the vehicle is stopped on a hill. One way of providing means for moving the slidable frame as shown in this modification, comprises a pair of rings 49 and 49a welded to the inner adjacent sides of the beam 1 and outside body or plate 51 of the vehicle, and inserting through and between these rings a tube 50 which projects through holes in the body 51 and beam 1 provided therefor. These rings 49 and 49a act as bearing surfaces for the tube 50 and as reinforcements for the holes in beam 1 and plate 51. Inside the tube 50 blocks 52 and 57 are fixed by screws 52a and 57a, respectively, which blocks have aligned eccentric holes 58 and 59 for journaling shaft 60. On the outside of the vehicle, the block 52 may be provided with a projecting arm 53 having a spring pressed pin 54 with operating head 55 to be positioned into a hole 56 in the body 51. A similar hole to hole 56 may be provided at 180° from the one shown, so that the tube carrying the shaft 60 may be rotated to engage the pinion gear 61 mounted on the shaft 60, with the rack 63 mounted on the adjacent beam 4 of the slidable support. Thus when a wrench or a crank is applied to the hexagonal head 62 at the other end of the shaft 60 outside the vehicle, the pinion 61 may be turned to force the slidable support in either direction as desired. The block 52 may also be provided with a flange 65 along part of one of its sides, to engage the partial collar 64 and to prevent the assembly mounted in tube 50 from sliding out of place. For the purposes of illustration, the arm 53 is shown opposite the flange 65, however, in practice this flange would have to be located intermediate the 180° sweep of the lever 53 and accordingly should be at about 90° to the fixed position of the arm 53. In this modified embodiment the pinion may be engaged with the rack 63 only when desired or necessary. Also it may be mounted on either side of the vehicle and preferably on the side away from the normal stream of traffic when the vehicle is stopped along a road and access must be had to the engine.

In Figs. 1–1b and 3–3a there is shown a compartment 66 entirely separated from the inside of the vehicle by means of a fixed cover or hood 67, so that there are no cracks, doors, or openings to rattle or to permit fumes and dust from the engine entering the interior of the vehicle. This hood is shown provided with a glass 68 over the instrument panel 18 mounted on frame 16 so the instruments may be observed from inside the vehicle when the engine is in its driving position shown in Fig. 1.

The drive shaft 69 extending from the rear end of the transmission 12 is connected to a universal joint 70 and thence to a tubular drive shaft 71 the inside inner end of which adjacent the coupling 70 is provided with pointed grooves 91 (see Fig. 2) which engage the exterior pointed grooves 92 on telescoping shaft 72 fixed to the vehicle main frame or universal joint outside the differential (not shown). The tubes 71 and 72 overlap each other a sufficient distance so as to remain one inside the other even when the engine and its support are pulled into the position shown in Figs. 3 and 3a, however, in this position the inter-engaging grooves 91 and 92 of the dog-type clutch (see my Netherlands Patent No. 58,490) at the inner end of drive shaft 71 are disengaged so that operation of the motor when in this extended position will not move the vehicle, even if the transmission gears have been meshed to turn the shaft 71.

The exhaust pipe or conduit 73 from the engine may also be provided with a telescoping tube 74 if the silencer or muffler or exhaust outlet are located on the main frame of the vehicle, and not on the slidable support for the engine. In such a case the telescoping exhaust pipes 73 and 74 are made of such a length so as not to slide one out of the other even when the engine is in its extended position shown in Figs. 3 and 3a, so that running of the engine for testing purposes will still convey the exhaust fumes through their regular channels. When the motor is in its driving position, a friction engagement between the outer end of the tube 73 and the inner end of the tube 74 is provided by a Sylphon 75 (partially shown in section in Fig. 6) and tapered engaging surfaces 77 and 78 maintained in close contact with each other by the spring action of the Sylphon 75. This friction engagement prevents any leakage of fumes between the tubes 73 and 74. The final urging of the sliding frame from the dotted position 15' shown in Fig. 1 into its full line position, collapses to a slight degree the Sylphon 75 so that the tapered faces 77 and 78 will tightly contact each other. This Sylphon arrangement also takes care automatically of any expansion or contraction in the length of the tubes 73 and 76 due to changes in temperature. The small clearance and tight fitting of these tubes also reduces undesirable vibrations between the tubes 73 and 74 causing noise.

In the embodiment shown in Fig. 1, if the driver's seat is located to one side of the motor as shown by dotted lines 79, the clutch pedal lever 81 may be pivoted on shaft 80 journaled in the body portion or beam 1 of the vehicle and connected by means of rod 83 to a rocking lever 84 journaled on shaft 85 mounted in bearing 86 fixed to beam 1. The shaft 85 also carries an abutting lever 87 which adjustably engages lever 88 mounted on shaft 89 which operates the clutch 11 and is mounted on the slidable engine support so as to be in engagement with the lever 87 when said slidable support is in its driving position as shown in Fig. 1. Since there is no obstructing overlap between the levers 87 and 88 in the direction of motion of the slidable support, the simple abutment-type engagement disclosed between the ends of these levers is sufficient and satisfactory.

A similar arrangement for the links and levers between the accelerator pedal (not shown) and the carburetor on the engine may be provided.

Although this invention has been described in combination with a vehicle having a motor mounted longitudinally in the front end on its frame, the same principles and connections can be applied for slidable mountings for motors which are positioned cross-ways of the vehicle frame and thereby may slide out one side of the vehicle. Also, the support for the engine may be pivoted on a vertical axis for removal from the body of the vehicle, particularly if the engine is mounted in the side of the vehicle or under the center of the vehicle as is now the case in many autobusses. In such a structure the use of telescoping connections, flexible tubes, dog-type clutches, and abutting couplings of the type described above may be employed, so that the engine may be tested and run even when in its extended position. For example, many of the connections including the exhaust pipe may pass through the center of the pivotal mounting for the frame supporting the engine.

In the modifications shown in Figs. 4 and 5 a rack and pinion driving mechanism are shown, however, other mechanisms may be employed such as for example a walking-dog instead of a pinion to engage the rack on the slidable frame; or a fluid pressure system and piston may be provided which may be connected to the fluid pressure control system already installed in the vehicle; or any known electrical or mechanical moving device.

While there is described above the principles of this invention in connection with specific apparatus, it is to be clearly understood that this description is made only by way of example and not as a limitation to the scope of this invention.

What is claimed is:

1. A self-propelled motor vehicle comprising a frame, an engine for driving said vehicle, means on said frame for supporting said engine, means on said frame for controlling and operating said engine for driving said vehicle, means permitting movement of said engine supporting means relative to said frame between fixed limits, and control conduit means continuously connected between said engine and said frame for operating said engine from said frame in any position of its supporting means between said limits, said conduit means including telescopic connections and means to lock said connections into position when said supporting means is in its vehicle driving position at one of said limits.

2. The vehicle of claim 1 wherein said control conduit means also includes a plurality of flexible conduits with means to mount one end of said conduits to said engine supporting means and means to mount the other end of said conduits to said frame.

3. A motor vehicle comprising a frame, an engine, means for supporting said engine, a handle pivotally mounted on said supporting means for permitting movement of said engine supporting means to different positions relative to said frame, means including hooks on said frame and a supporting toggle lever system pivotally connected to said handle means and engageable with said hooks for locking said supporting means in one position for driving said vehicle, and flexible control conduit means continuously connected between said engine and said frame for operating said engine from said frame in any position of said engine supporting means.

4. A motor vehicle comprising a frame, an engine for driving said vehicle, means on said frame for supporting said engine, means on said frame for controlling and operating said engine for driving said vehicle, means permitting movement of said engine supporting means relative to said frame between fixed limits, one limit being in vehicle driving position and the other limit being away from its vehicle driving position, engine supply conduit means continuously connected between said supporting means and said frame for operating said engine from said frame in any position of said engine supporting means at and between said limits, and engageable and disengageable vehicle control connections between said engine supporting means and said frame, said connections being disengaged when said engine supporting means is out of driving position.

5. A vehicle according to claim 4 including a partition means between said engine and the other parts of said vehicle, said engine being adjacent said partition when in its vehicle driving position.

6. A motor vehicle according to claim 4 wherein said frame comprises two parallel beams and a U-shaped member connected between said beams out of the plane of said beams, whereby said engine may move through the U of said U-shaped member along said parallel beams.

7. A vehicle according to claim 4 wherein said engine is an internal combustion engine and said conduit means comprises a flexible fuel line for said engine.

8. A vehicle according to claim 4 wherein said conduit means include a flexible electrical conductor.

9. A vehicle according to claim 4 wherein one of said conduit means comprises two telescopic tubes, one of which tubes is fixed to said frame and the other of which tubes is fixed to said engine supporting means, and a Sylphon having an abutting collar at one end mounted at the end of one of said tubes, whereby the end of the other of said tubes abuts against said collar and slightly compresses said Sylphon to maintain a gas tight joint between said tubes when said engine is in its vehicle driving position.

10. A motor vehicle comprising: a main frame, a gear shift lever, a fixed pivot on said main frame for journalling said gear shift lever, an engine including a transmission, an auxiliary frame supporting said engine and said transmission, means permitting movement of said auxiliary frame relative to said main frame into and out of a vehicle driving position, control means mounted on said auxiliary frame for shifting of gears in said transmission, said control means being adjacent to and engageable by said gear shift lever on said frame when said auxiliary frame is in its vehicle driving position, and means to lock and unlock said gear shift lever into and out of engagement with said control means on said auxiliary frame for controlling the shifting of gears of said transmission when said auxiliary frame is in said vehicle driving position.

11. The vehicle of claim 10 wherein said means to lock and unlock said gear shift lever comprises a disengageable ball and socket joint, one part of which is connected to said gear shift lever and the other part of which is connected to said control means, and means associated with said lever permitting the longitudinal movement of said gear shift lever to lock said lever into two different positions corresponding to said ball and socket being in and out of engagement.

HUBERTUS JOSEPHUS v. DOORNE.

REFERENCES CITED

The following references are of record in the file of this patent:

UNITED STATES PATENTS

| Number | Name | Date |
|---|---|---|
| 2,074,533 | Bicusa | Mar. 23, 1937 |
| 2,320,601 | Howell | June 1, 1943 |
| 2,337,038 | Fentress | Dec. 21, 1943 |

FOREIGN PATENTS

| Number | Country | Date |
|---|---|---|
| 115,795 | Great Britain | May 23, 1918 |
| 553,185 | Great Britain | May 11, 1943 |
| 724,547 | France | Jan. 29, 1932 |